United States Patent
Hameau et al.

(10) Patent No.: US 9,768,827 B2
(45) Date of Patent: Sep. 19, 2017

(54) INTERMITTENT UWB RECEIVER

(71) Applicant: Commissariat a l'energie atomique et aux energies alternatives, Paris (FR)

(72) Inventors: Frederic Hameau, Saint Nizier du Moucherotte (FR); Gilles Masson, Saint-Jean de Moirans (FR); Laurent Ouvry, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 15/028,647

(22) PCT Filed: Oct. 10, 2014

(86) PCT No.: PCT/EP2014/071731
§ 371 (c)(1),
(2) Date: Apr. 11, 2016

(87) PCT Pub. No.: WO2015/055522
PCT Pub. Date: Apr. 23, 2015

(65) Prior Publication Data
US 2016/0261307 A1   Sep. 8, 2016

(30) Foreign Application Priority Data
Oct. 18, 2013  (FR) ..................... 13 60183

(51) Int. Cl.
*H04B 1/7115*   (2011.01)
*H04B 1/7183*   (2011.01)
(Continued)

(52) U.S. Cl.
CPC ....... *H04B 1/7183* (2013.01); *H04B 1/70758* (2013.01); *H04B 1/7115* (2013.01);
(Continued)

(58) Field of Classification Search
CPC ............. H04B 1/7183; H04B 1/70758; H04B 1/7115; H04B 1/7163; H04B 2201/7163;
(Continued)

(56) References Cited

U.S. PATENT DOCUMENTS 6,370,397 B1 *  4/2002  Popovic .................. H04B 1/38
                                                                    455/557
6,590,888 B1 *  7/2003  Ohshima .............. H04B 1/7073
                                                                    370/335
(Continued)

FOREIGN PATENT DOCUMENTS

FR   1 259 861   6/1960

OTHER PUBLICATIONS

International Search Report issued Dec. 18, 2014 in PCT/EP2014/071731 filed on Oct. 10, 2014.
(Continued)

*Primary Examiner* — Jean B Corrielus
(74) *Attorney, Agent, or Firm* — Oblon, McClelland, Maier & Neustadt, L.L.P.

(57) ABSTRACT

A UWB impulse receiver including an RF stage followed by a baseband processing stage. The baseband processing stage includes a Rake filter including a plurality of time fingers, each finger including an integrator of the baseband signal during an acquisition window, a control module, and a detection module estimating the received symbols from the integration results. During a synchronization phase, the control module drives respective positions of the acquisition windows associated with the different fingers, to scan at a reception interval, the RF stage only operating, in a course of the synchronization phase, during the plurality of acquisition windows.

10 Claims, 10 Drawing Sheets

(51) Int. Cl.
  *H04B 1/7163* (2011.01)
  *H04B 1/7075* (2011.01)

(52) U.S. Cl.
  CPC ... *H04B 1/7163* (2013.01); *H04B 2201/7073* (2013.01); *H04B 2201/70707* (2013.01); *H04B 2201/70979* (2013.01); *H04B 2201/7163* (2013.01)

(58) Field of Classification Search
  CPC .. H04B 2201/70707; H04B 2201/7073; H04B 2201/70979
  See application file for complete search history.

(56) References Cited

U.S. PATENT DOCUMENTS

| | | | | |
|---|---|---|---|---|
| 2002/0034215 | A1* | 3/2002 | Inoue | H04B 1/7117 375/147 |
| 2004/0218576 | A1* | 11/2004 | Imagawa | H04B 1/0057 370/342 |
| 2007/0248191 | A1* | 10/2007 | Pettersson | H04B 1/707 375/340 |
| 2008/0205569 | A1* | 8/2008 | Kwak | H04B 1/69 375/371 |
| 2009/0028220 | A1* | 1/2009 | Roh | H04L 25/0216 375/136 |
| 2009/0103671 | A1* | 4/2009 | Raphaeli | G06K 7/10306 375/354 |
| 2010/0202496 | A1* | 8/2010 | Hoyos | H04B 1/0028 375/147 |
| 2011/0000032 | A1* | 1/2011 | Pichon | E04H 4/1654 15/1.7 |
| 2011/0122929 | A1* | 5/2011 | Razzell | H04B 1/7176 375/219 |
| 2013/0039389 | A1* | 2/2013 | Wang | H04B 1/712 375/147 |
| 2014/0256353 | A1 | 9/2014 | Denis et al. | |
| 2014/0287776 | A1 | 9/2014 | Denis et al. | |
| 2015/0372715 | A1 | 12/2015 | Dehmas et al. | |

OTHER PUBLICATIONS

French Preliminary Search Report issued May 26, 2014 in FR 1360183 filed on Oct. 18, 2013.

Igor Dotlic, et al., "Low Complexity Chirp Pulsed Ultra-Wideband System with Near-Optimum Multipath Performance", IEEE Transactions on Wireless Communications, IEEE Service Center, vol. 10, No. 1, XP011362745, 2011, pp. 1-11.

Soonkoo Kwon, et al., "A Joint Timing Synchronization, Channel Estimation, and SFD Detection for IR-UWB Systems", Journal of Communications and Networks, vol. 14, No. 5, Oct. 2012, pp. 501-509.

Dominique Morche, et al., "Double-Quadrature UWB Receiver for Wide-Range Localization Applications With Sub-cm Ranging Precision" IEEE Journal of Solid-State Circuits, vol. 48, No. 10, XP011527452, Oct. 2013, pp. 2351-2362.

David Barras, et al., "A Low-Power Baseband ASIC for an Energy-Collection IR-UWB Receiver", IEEE Journal of Solid-State Circuits, vol. 44, No. 6, XP011258520, Jun. 2009, pp. 1721-1733.

Muhammad Gufran Khan, "On Coherent and Non-coherent Receiver Structures for Impulse Radio UWB Systems", Blekinge Institute of Technology, Licentiate Dissertation Series No. 2009:02, School of Engineering, 2009, Total 141 pages.

David D. Wentzloff, et al., "Energy Efficient Pulsed-UWB CMOS Circuits and Systems", Proc. of ICUWB Conference, 2007, Total 6 pages.

Gilles Masson, et al., "A 1 nJ/b 3.2-to-4.7 GHz UWB 50 Mpulses/s Double Quadrature Receiver for Communication and Localization", Proc. of the ESSCIRC 2010, 2010, pp. 502-505.

X. Wang, et al., "A High-Band IR-UWB Chipset for Real-Time Duty-Cycled Communication and Localization Systems", IEEE Asian Solid-State Circuits Conference, Nov. 14-16, 2011, pp. 381-384.

Bram Nauta, "A CMOS Transconductance-C Filter Technique for Very High Frequencies", IEEE Journal of Solid-State Circuits, vol. 27, No. 2, Feb. 1992, pp. 142-153.

* cited by examiner

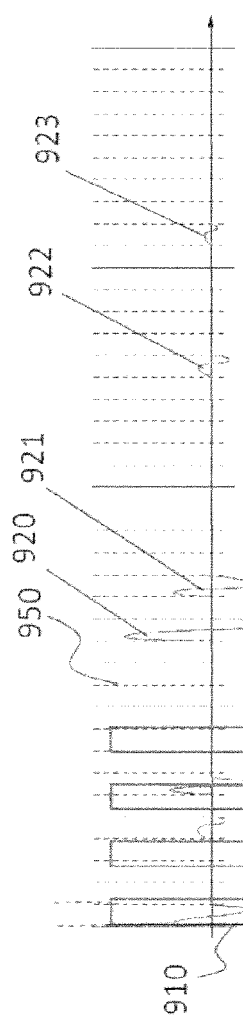
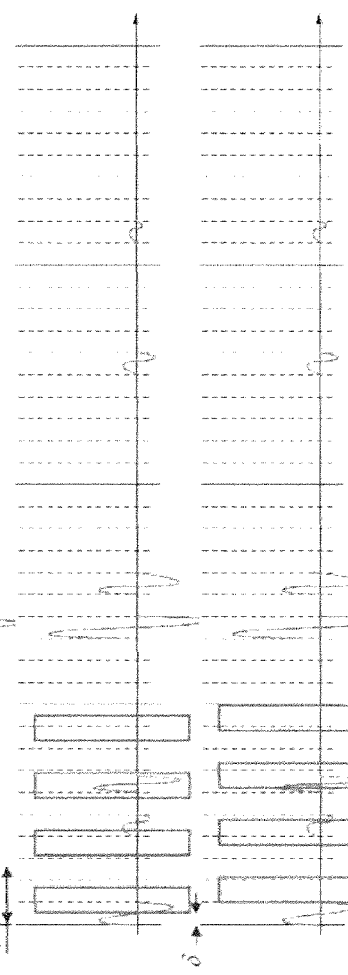
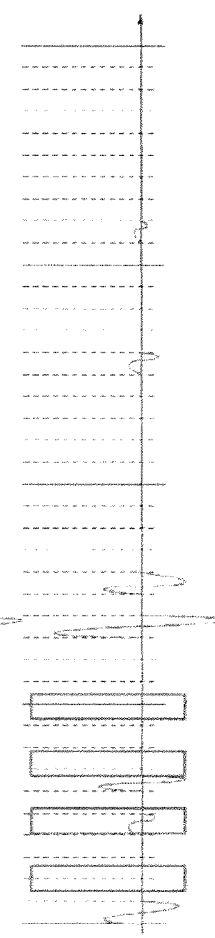
FIG. 9A
FIG. 9B
FIG. 9C
FIG. 9D

INTERMITTENT UWB RECEIVER

TECHNICAL FIELD

The present invention relates to the field of UWB (Ultra Wide Band) receivers and more particularly the duty cycled UWB impulse receivers.

STATE OF PRIOR ART

The ultra wide band (UWB) telecommunication systems, whether of the impulse (IR-UWB) type or not must transmit in certain well-defined specific frequency bands, depending on regional regulations, and having a frequency spectrum of a minimum width (500 MHz in the United States).

The lack of internationally harmonized regulations on the one hand and the multiplication of the UWB standards for different types of application, on the other hand, lead to the prevision of receivers able to operate in several frequency bands.

FIG. 1 shows by way of example the frequency plan used in the IEEE 802.15.4a and IEEE 802.15.16 standards, in the 2-6 GHz band. It is reminded that the IEEE 802.15.4a and IEEE 802.15.16 standards both use a UWB impulse transmission, the IEEE 802.15.4a standard being relative to the low data rate (LDR) UWB transmission for localization applications and the IEEE 802.15.6 standard concerning the Body Area Networks (BAN) a component of which implements a UWB transmission.

FIG. 2A shows an example of UWB impulse signal, such as transmitted by a UWB transmitter. This signal is time-divided into transmission intervals, each transmission interval being divided into chips. Each transmission interval can comprise one or more unit impulses, each unit impulse being situated in a distinct chip, the position of the unit impulses in the transmission interval being for example given by an access code. The unit impulse(s) can be the object of a time position modulation (PPM modulation) or an amplitude modulation or even a phase modulation (generally a simple BPSK polarity modulation) to encode a symbol (generally a binary symbol) to be transmitted.

FIG. 2B shows the same UWB impulse signal at the output of a multipath channel. It can be seen that each unit impulse gave rise to a plurality of attenuated and delayed unit impulses, each delay corresponding to a path of the channel.

Non-coherent UWB receivers and coherent UWB receivers are generally distinguished. In a coherent UWB receiver, it is assumed that the impulse response of the transmission channel is known (for example by means of a prior estimation of the channel). The coherent UWB receiver then carries out a correlation of the signal with unit impulses distributed according to delays corresponding to the different paths of the impulse response, in other words with a reference signal obtained as the convolution of a unit impulse with the impulse response of the channel. Correlation can be obtained using a Rake filter each finger of which comprises a filter adapted to the unit impulse and is associated with a path of the channel. The results of the correlation are then combined to carry out a detection of the transmitted symbols.

On the other hand, in a non-coherent receiver, there is no available a priori knowledge of the impulse response of the channel or, at the very least, of the total impulse response insofar as the phase of this response can be unknown. The receiver carries out a detection of the energy of the signal received in a plurality of distinct time windows, determines the presence or absence of an impulse in each of these windows, and deduces therefrom the transmitted symbols.

A description of the architecture of a coherent UWB impulse receiver (also referred to as Impulse Radio UWB, IR-UWB) and of that of a non-coherent IR-UWB receiver will be found in M. G. Khan's thesis entitled "On coherent and non-coherent receiver structures for impulse radio UWB systems", Blekinge Institute of Technology, 2009. An example of implementation of an IR-UWB receiver is also depicted in D. D. Wentzloff et al.'s paper entitled "Energy efficient pulsed UWB CMOS circuits and systems" published in Proc. of ICUWB Conference, 2007.

Besides, an architecture of a double quadrature IR-UWB receiver is known. In such a receiver, the received impulse signal is baseband demodulated or at an intermediate frequency and the position of an impulse is determined within a time window thanks to a projection on a base of reference signals. The time window is then synchronized on the received impulse so as to enable the transmitted symbols to be detected. Once the window is synchronized, the detection can then be carried out in a non-coherent way by summing the received energy, or in a coherent way, by correlation with a unit impulse.

A first architecture of a double quadrature receiver has been described in G. Masson et al.'s paper entitled "A 1nJ/b 3.2 to 4.7 GHz UWB 50 Mpulses/s double quadrature receiver for communication and localization" published in Proc. of the ESSCIRC 2010, Sep. 14-16, 2010, Seville, Spain.

This architecture was then upgraded in the application FR 12 59861, entitled "Méthode de détermination du temps d'arrivée d'une impulsion UWB et récepteur correspondent" filed in the name of the applicant.

The general architecture of a non-coherent UWB receiver is illustrated in FIG. 3.

The receiver 300 comprises, after amplification by a low noise amplifier (LNA), 310, a first stage, 320, performing a translation into baseband using a quadrature mixing at the centre frequency of the signal. The in-phase and quadrature signals are respectively denoted $s_I$ and $s_Q$.

The receiver 300 further includes a second stage comprising a first quadrature mixer 331, at the output of the in-phase channel of the first stage, and a second quadrature mixture 332, at the output of the quadrature channel of the first stage. The quadrature mixers 331 and 232 perform a projection of the signals $s_I/s_Q$, on a base of reference signals. The signals obtained by projection, denoted $s_{II}/s_{IQ}$, for the channel I and $s_{QI}/s_{QQ}$ for the channel Q, are integrated inside a time window, by means of the integrators 340.

The reference base can be made of a couple of quadrature sinusoids having a period equal to twice the width of the integration time window. The integrated signals, denoted $r_{II}$, $r_{IQ}$, $r_{QI}$, $r_{QQ}$ are converted into digital signals in the analogue/digital converters 350, before being supplied to a detection module 360.

Whatever the type of IR-UWB receiver, the impulse nature of the signal enables the consumption of the receiver to be reduced by having the RF stage of the latter operating intermittently, only during listening intervals of the impulses. An IR-UWB receiver operating according to this mode is referred to as being intermittent or duty-cycled. Given the low duty factor of a UWB impulse signal, the energy consumption reduction of the receiver is highly significant.

An intermittent IR-UWB receiver was in particular described in X. Wang et al.'s paper entitled "A high-band IR-UWB chipset for real-time duty-cycled communication and localization systems" published in Proc. of IEEE Asian solid-state circuits conference, pp. 381-384, November 2011, Jeju, Korea.

However, this intermittent operation implies that the receiver has previously synchronized on the impulses of the received signal. To that end, the IR-UWB transmitter transmits a synchronization preamble as indicated in FIG. 4. The synchronization preamble 410 is here made of M successive symbols (each symbol being transmitted using a transmission interval and being thus able to be encoded using N unit impulses 411, as indicated in the Figure). The synchronization preamble is followed by a payload 420.

However, the drawback of the intermittent IR-UWB receiver such as described in the above-mentioned paper is that it must operate continuously during the synchronization phase. Thus, throughout the duration of this phase, the RF stage of the IR-UWB receiver must be powered and consequently consumes energy.

An object of the present invention is to provide an intermittent IR-UWB receiver requiring a lower energy consumption than that known from prior art, and particularly to reduce its consumption during the synchronization duration of the receiver.

DISCLOSURE OF THE INVENTION

The present invention is defined by a UWB impulse signal receiver, said UWB signal being time-divided into unit intervals of a predetermined duration ($T_{PRP}$), a symbol being transmitted over a plurality N of unit intervals, each unit interval comprising a unit impulse, the UWB signal comprising a synchronization preamble followed by a payload, the synchronization preamble comprising a sequence of M identical symbols; said receiver comprising an RF stage followed by a baseband processing stage, the RF stage being adapted to amplify said signal and to carry out a translation into baseband of the thus amplified signal. The baseband processing stage comprises:

a rake processor comprising a plurality K of time fingers, each time finger being adapted to carry out a processing of an acquisition window associated with said finger;

a detection module to estimate at least one received symbol from the processing results supplied by said fingers;

a control module adapted to control the respective positions of the acquisition windows within a reception interval, so as to scan this interval in the course of a synchronization phase, said RF stage only operating, in the course of this phase, during said plurality of acquisition windows.

Said processing is preferably an integration, each time finger thus integrating the baseband signal in the acquisition window associated with this finger.

Advantageously, the control module drives the time windows so that they drift by a predetermined time pitch from one reception interval to the following one.

The RF stage typically comprises a low noise amplifier followed by a first quadrature mixing stage supplying an in-phase channel and a quadrature channel.

The RF stage advantageously comprises a pair of low pass or band-pass filters of controllable cut-off frequencies, said pair of filters respectively filtering the in-phase channel and the quadrature channel.

According to a first alternative, the RF stage also comprises a second mixing stage translating into baseband the in-phase channel to supply first and second orthogonal signals and the quadrature channel to supply third and fourth orthogonal signals.

According to a second alternative, the RF stage comprises a second mixing stage projecting the in-phase channel on an orthogonal base of reference signals, to supply first and second orthogonal signals, and projecting the quadrature channel on the same base, to supply third and fourth orthogonal signals.

Preferably, each time finger comprises first, second, third and fourth integrators to respectively integrate the first, second, third and fourth orthogonal signals on the same acquisition window associated with said finger, the integration results from these integrators being supplied to the detection module.

The integration results from the first, second, third and fourth integrators can then be digitized in first, second, third and fourth analogue/digital converters before being supplied to the detection module.

In every case, the powering of the RF stage can be cut-off outside said plurality of acquisition windows.

Advantageously, at the end of the synchronization phase, the energies respectively received in said acquisition windows, in the course of the receiving scanning, are compared to each other and a second plurality (K') of time positions is determined corresponding to the highest received energies, the acquisition windows of the rake processor being then respectively positioned on this second plurality of time positions in a payload reception phase following the synchronization phase.

BRIEF DESCRIPTION OF THE DRAWINGS

Further characteristics and advantages of the invention will appear upon reading a preferential embodiment of the invention made with reference to the accompanying Figures among which:

FIGS. 9A to 9D depict the scanning of a reception interval by the acquisition windows, in the course of the synchronization phase of the receiver;

DETAILED DISCLOSURE OF PARTICULAR EMBODIMENTS

A receiver intended to receive a UWB impulse signal (IR-UWB receiver), such as the one described in the introductory part will again be considered thereafter. The UWB impulse signal is divided into transmission intervals, each transmission interval being itself divided into chips. A symbol (typically a binary symbol) is transmitted over a transmission interval by means of a sequence of unit impulses (which can be reduced to a single impulse) distributed on the different chips of the interval. The symbol modulates said sequence using a PPM and/or PAM (or even QAM) modulation.

Figure 1:
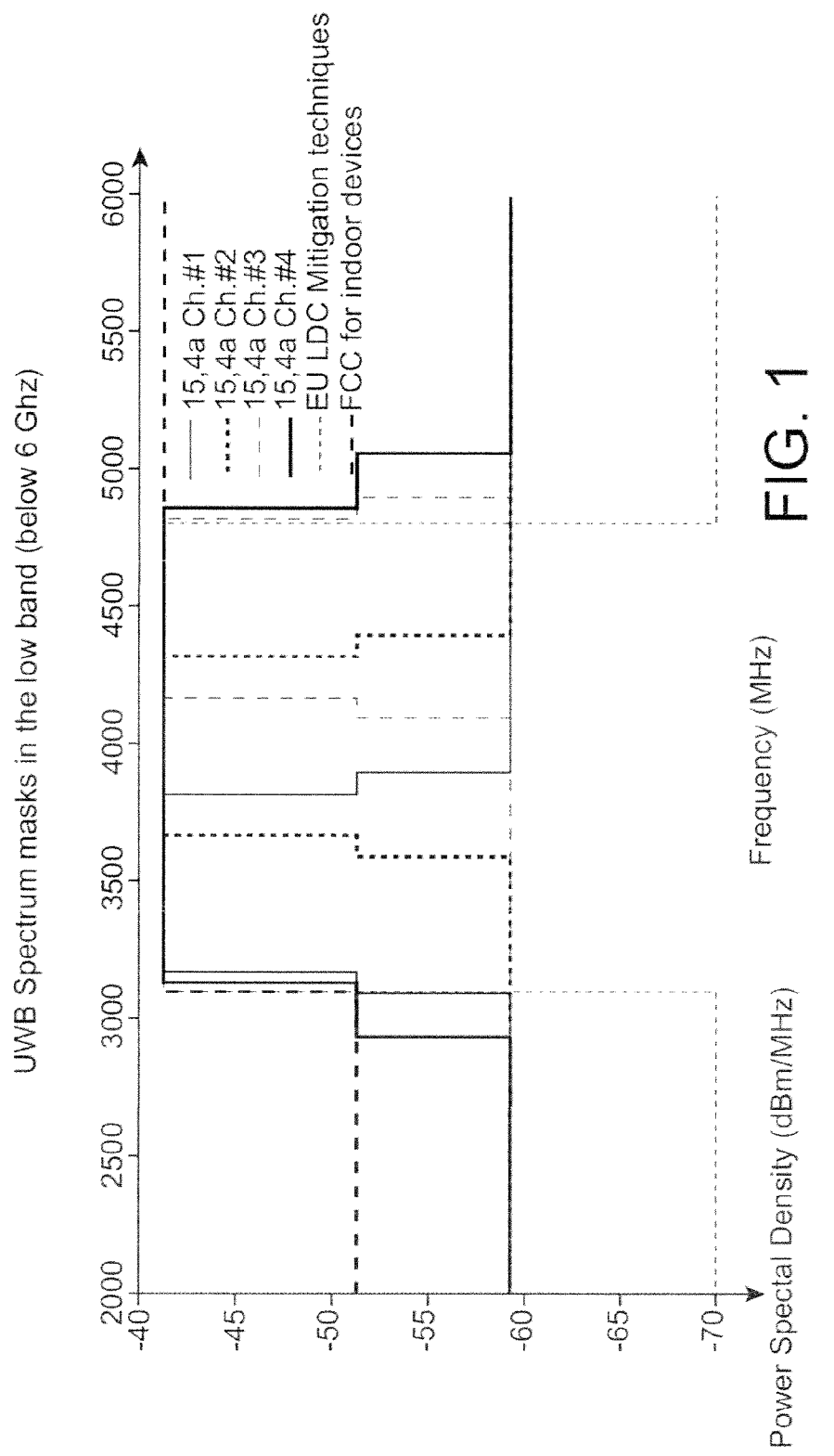
FIG. 1 represents an example of a frequency plan in a UWB spectral band.
Figure 2A:
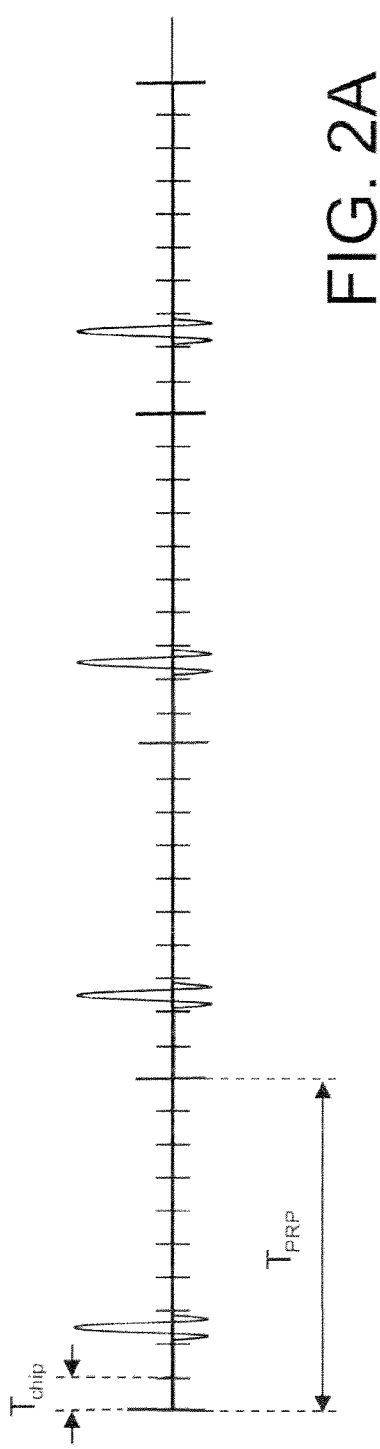
FIGS. 2A and 2B respectively represent a signal transmitted by a transmitter and a signal received by an IR-UWB receiver.
Figure 2B:
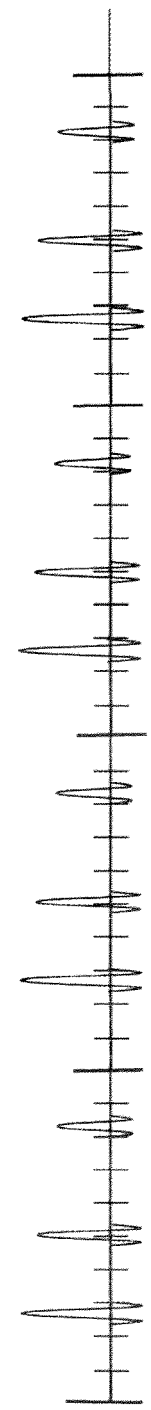
Figure 3:
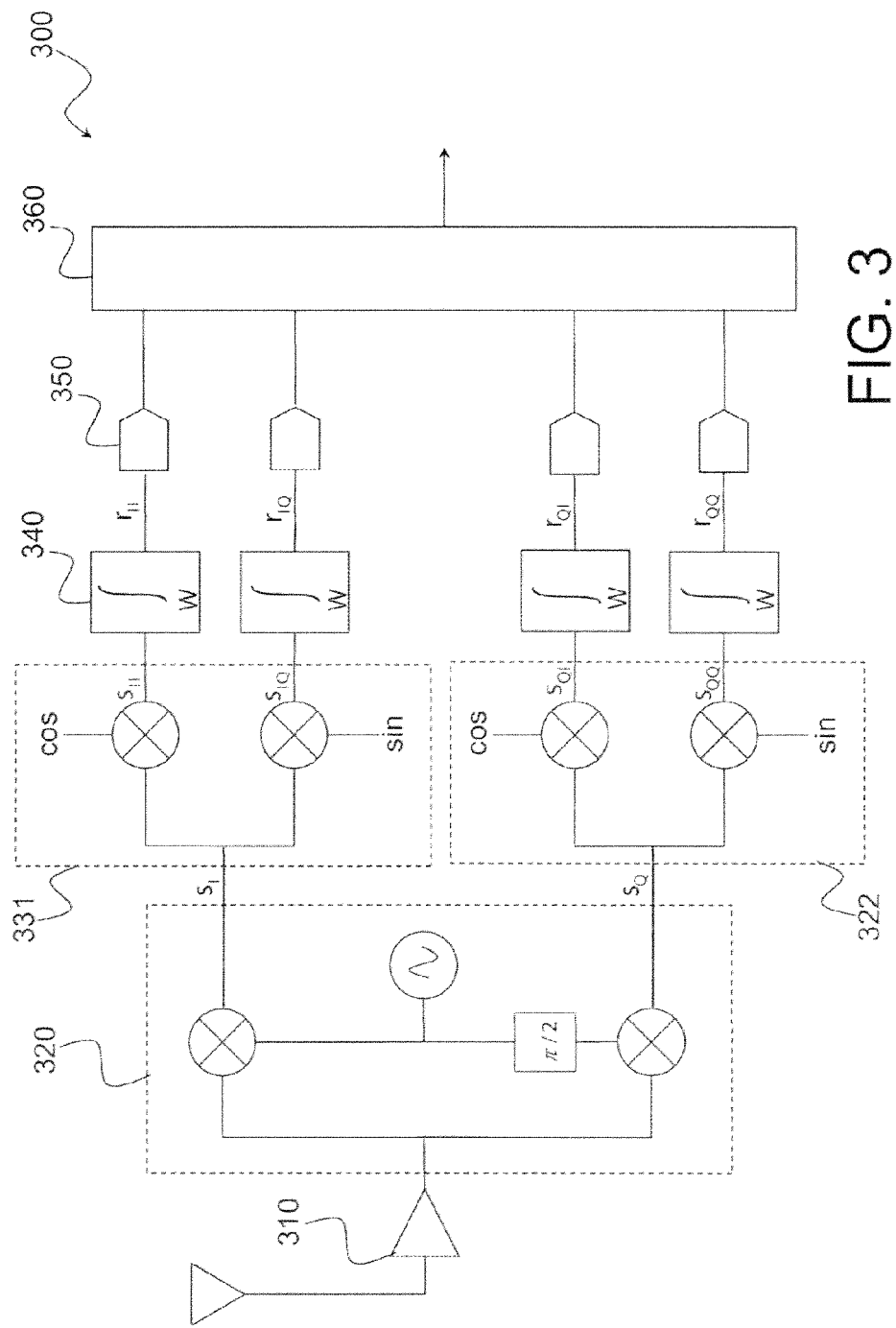
FIG. 3 schematically represents a first example of a UWB receiver known from prior art.
Figure 4:
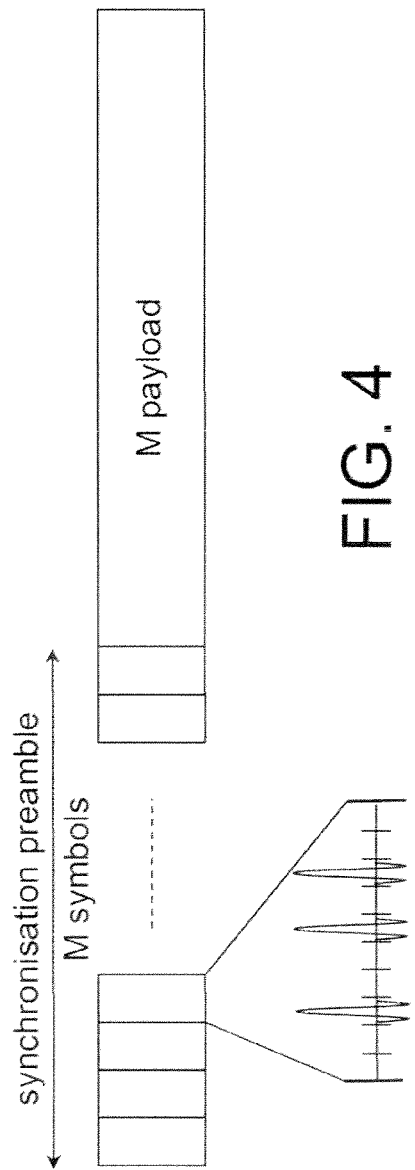
FIG. 4 represents the structure of an IR-UWB transmission, known from prior art.
Figure 5:
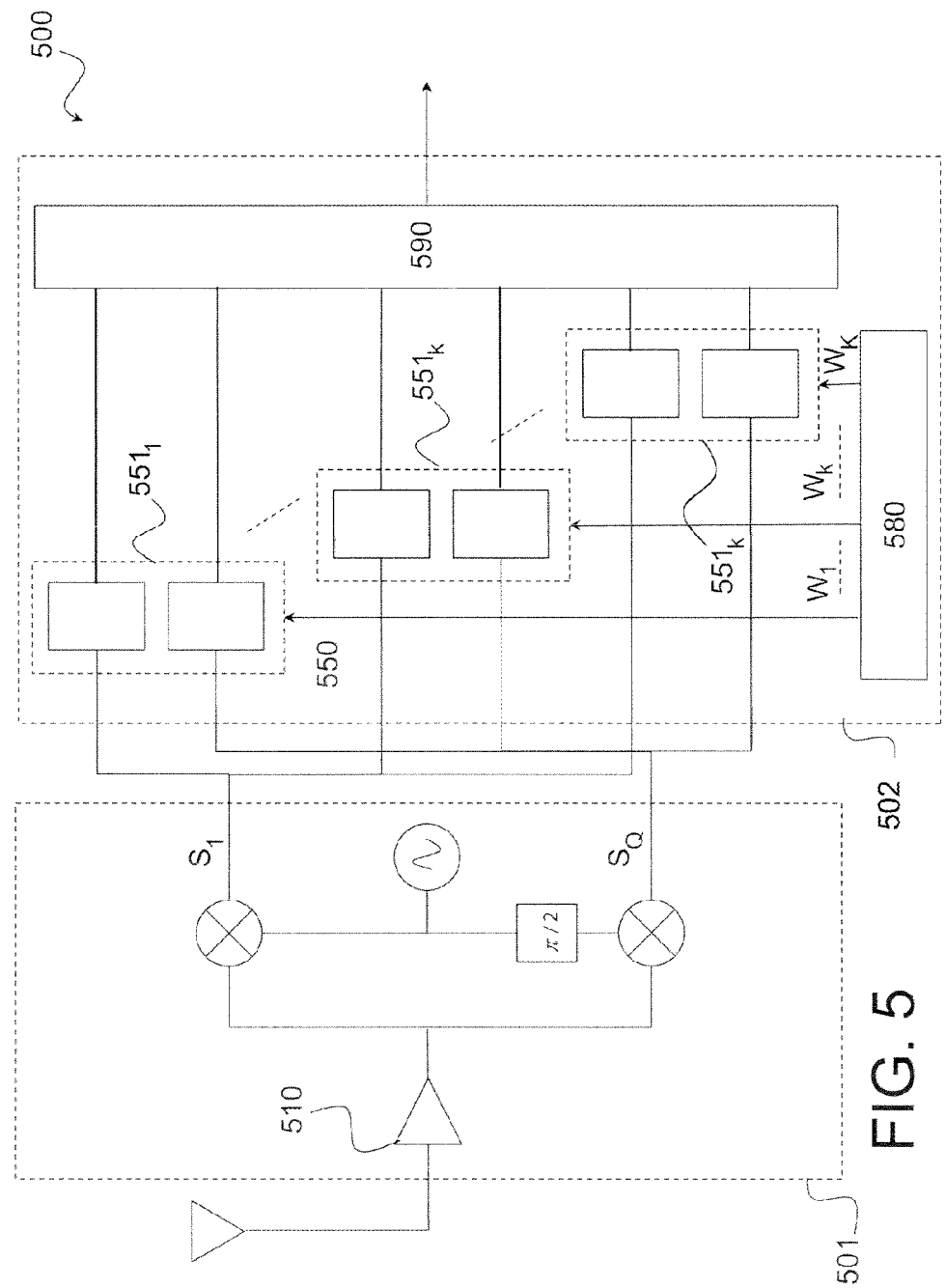
FIG. 5 schematically represents the structure of an IR-UWB receiver according to an embodiment of the invention.

FIG. 5 represents the architecture of an intermittent IR-UWB receiver according to an embodiment of the invention.

The receiver 500 comprises an RF stage 501, and a baseband processing stage 502.

The RF stage 501 comprises a low noise amplifier 510, one or more demodulation stages, to bring the received signal into baseband. For example, the RF stage can comprise a demodulation stage at an intermediate frequency followed, if need be, by a baseband demodulation stage or by a projection stage along an orthogonal base of reference signals.

In every case, the baseband processing stage 502 comprises a rake processor 550, having K time fingers $551_1, \ldots, 551_K$, each time finger being adapted to process said baseband signal during a determined time window, also referred to as an acquisition window. The time windows of the different fingers of the rake processor 550 are controlled by a control module 580. More precisely, the control module 580 determines the position and, if need be, the duration of the time window for each time finger. The detection module 590 estimates the received symbol from the processing results of the K time fingers.

The processing carried out in each of the K time fingers $551_1, \ldots, 551_K$, is identical.

According to a first alternative, the processing carried out in the time fingers is an integration operation. More precisely, each finger $551_k$ carries out an integration of the baseband signal (channels I and Q) during a time window $W_k$.

According to a second alternative, the processing carried out in the time fingers is a filtering adapted to a unit impulse of the signal. More precisely, each finger $551_k$ is then a filter adapted to a unit impulse in the window $W_k$. The outputs of the unit filters can be combined by means of a Maximum Ratio Combining (MRC) and the combination result is compared to a threshold to deduce therefrom the symbol received within the detection module 590.

Those skilled in the art will be able to contemplate other processing alternatives within the time fingers without departing from the scope of the present invention. For example, the processing can consist, according to the contemplated modulation type, in a non-linear filtering, a peak signal detection, a square-law detection, etc.

Figure 6:
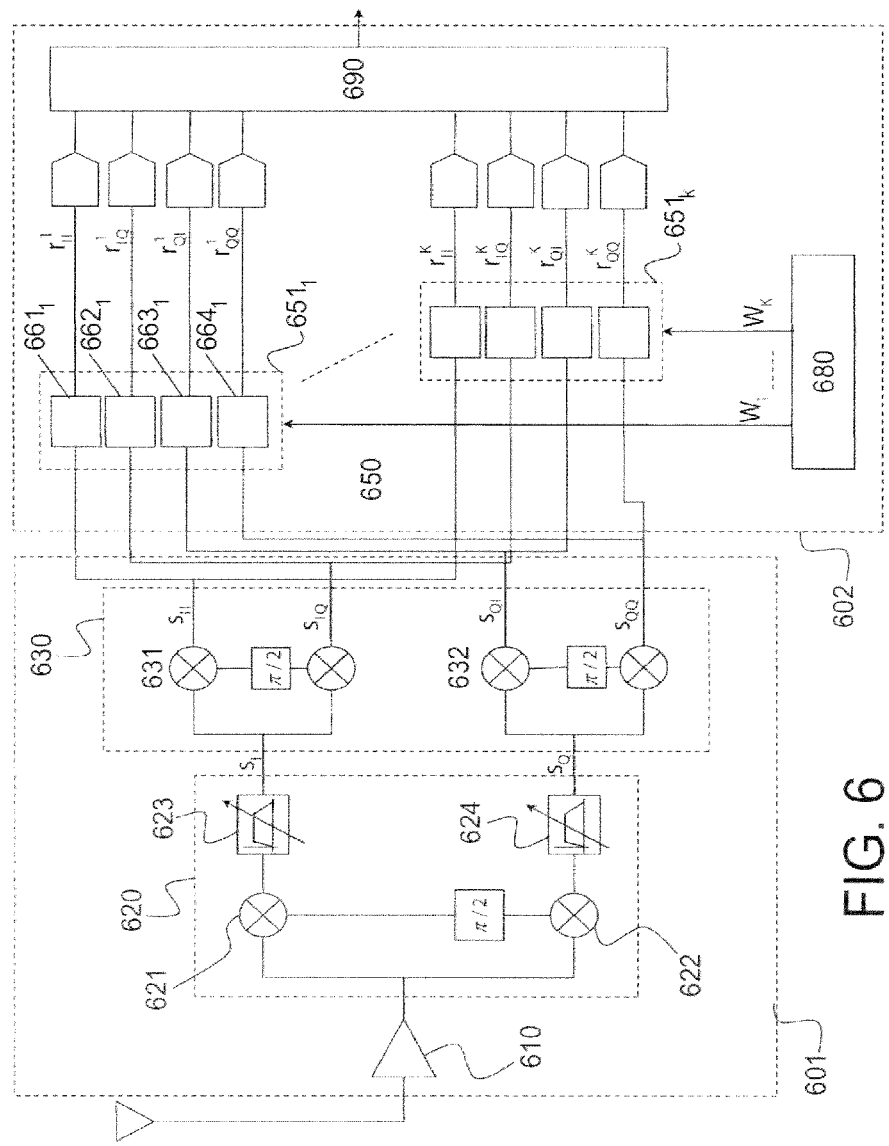
FIG. 6 schematically represents an IR-UWB receiver according to a particular exemplary implementation of the invention.

FIG. 6 represents an exemplary implementation of an IR-UWB receiver in accordance with the structure of FIG. 5.

The receiver 600 comprises an RF section, 601, including a low noise amplifier (LNA) 610, followed by a first quadrature demodulation stage 620, to bring the received signal into baseband or at an intermediate frequency. The first demodulation stage comprises two quadrature demodulators 621, 622, for example at the centre frequency of the signal, respectively supplying an in-phase signal $s_I$ and a quadrature signal $s_Q$. The signals $s_I$ and $s_Q$ are filtered by means of the filters 623 and 624. These filters have low and high controllable cut-off frequencies. According to the contemplated configuration, they can carry out a low pass filtering (in the case of a baseband demodulation) or band-pass filtering (in the case of a demodulation at an intermediate frequency). They can advantageously be implemented as bi-quad type gm-C filters. It is reminded that in such a filter, the band-pass can be modified by varying a control voltage. An example of gm-C filter is described in B. Nauta's paper entitled "A CMOS transconductance-C filter technique for very high frequencies", IEEE Journal of Solid State Circuits, vol. 27, No. 2, February 1992.

The signals $s_I$ and $s_Q$ thus filtered are possibly amplified in amplifiers on each channel (not represented) before passing into a second quadrature mixing stage 630. More precisely, the second stage 630 comprises a first quadrature mixer 631, at the output of the in-phase channel of the first stage, and a second quadrature mixer 632, at the output of the quadrature channel of the first stage.

According to a first configuration, the quadrature mixers 631 and 632 perform a projection of each of the signals $s_I$ and $s_Q$ on an orthogonal base of reference signals. As in the above-mentioned application FR 12 59861, the reference base can be made of a couple of quadrature sinusoids having a period equal to twice the width of the integration time window or even to the width of the window of the integration time window.

According to a second configuration, both quadrature mixers carry out a demodulation of the signals $s_I$ and $s_Q$ at the intermediate frequency to bring them back into baseband. More precisely, the signal at the intermediate frequency $s_I$ is demodulated into a first in-phase signal $s_{II}$ and a first quadrature signal $s_{IQ}$, referred to as first and second orthogonal signals, and the signal at the intermediate frequency $s_Q$ is demodulated into a second in-phase signal $s_{QI}$ and a second quadrature signal $s_{QQ}$, referred to as third and fourth orthogonal signals.

Whatever the configuration, the signals at the output of the second quadrature mixing stage are processed, in the baseband processing stage 602, by a rake processor 650, having K time fingers, $651_1, \ldots, 651_K$, each time finger being associated with an acquisition window $W_k$ centred on a time $t_k$, and each finger $651k$ comprising four processing modules $661k$, $662k$, $663k$, $664k$, respectively operating on the first, second, third and fourth orthogonal signals, $s_{II}$, $s_{IQ}$, $s_{QI}$, $s_{QQ}$, in the time window $W_k$. The different processing modules $661k$, $662k$, $663k$, $664k$ perform an identical operation, for example an integration in the acquisition window $W_k$, a filtering adapted to an impulse in this window, a square-law detection, or a peak detection as previously described.

The windows $W_k$ associated with the different time fingers are controlled by means of the control module 680.

The processing results of the signals $s_{II}$, $s_{IQ}$, $s_{QI}$, $s_{QQ}$ in the respective modules $661_k$, $662_k$, $663_k$, $664_k$ of the finger $651_k$ on the time window $W_k$ are denoted $r_{II}^k$, $r_{IQ}^k$, $r_{QI}^k$, $r_{QQ}^k$. The processing results $r_{II}^k$, $r_{IQ}^k$, $r_{QI}^k$, $r_{QQ}^k$ are converted into digital signals in analogue/digital converters 670, before being supplied to the detection module 690. This detection module can for example carry out a coherent or non-coherent sum of the results $r_{II}^k$, $r_{IQ}^k$, $r_{QI}^k$, $r_{QQ}^k$, and compare this sum with a predetermined threshold value to deduce therefrom the received symbol.

Those skilled in the art will understand that the analogue/digital conversion can occur more upstream of the processing line, for example before the rake processing (the processing being then performed digitally) or even before a quadrature mixing stage (the quadrature mixing being then performed digitally).

The idea underlying the invention is to take advantage of the time fingers of the rake processor during the synchronization preamble to enable an intermittent operation of the receiver.

More precisely, the operation of the rake processor during the synchronization phase, in other words the synchronization preamble reception phase, and the demodulation and tracking phase, that is the payload reception phase of the packet will be distinguished.

Figure 7:
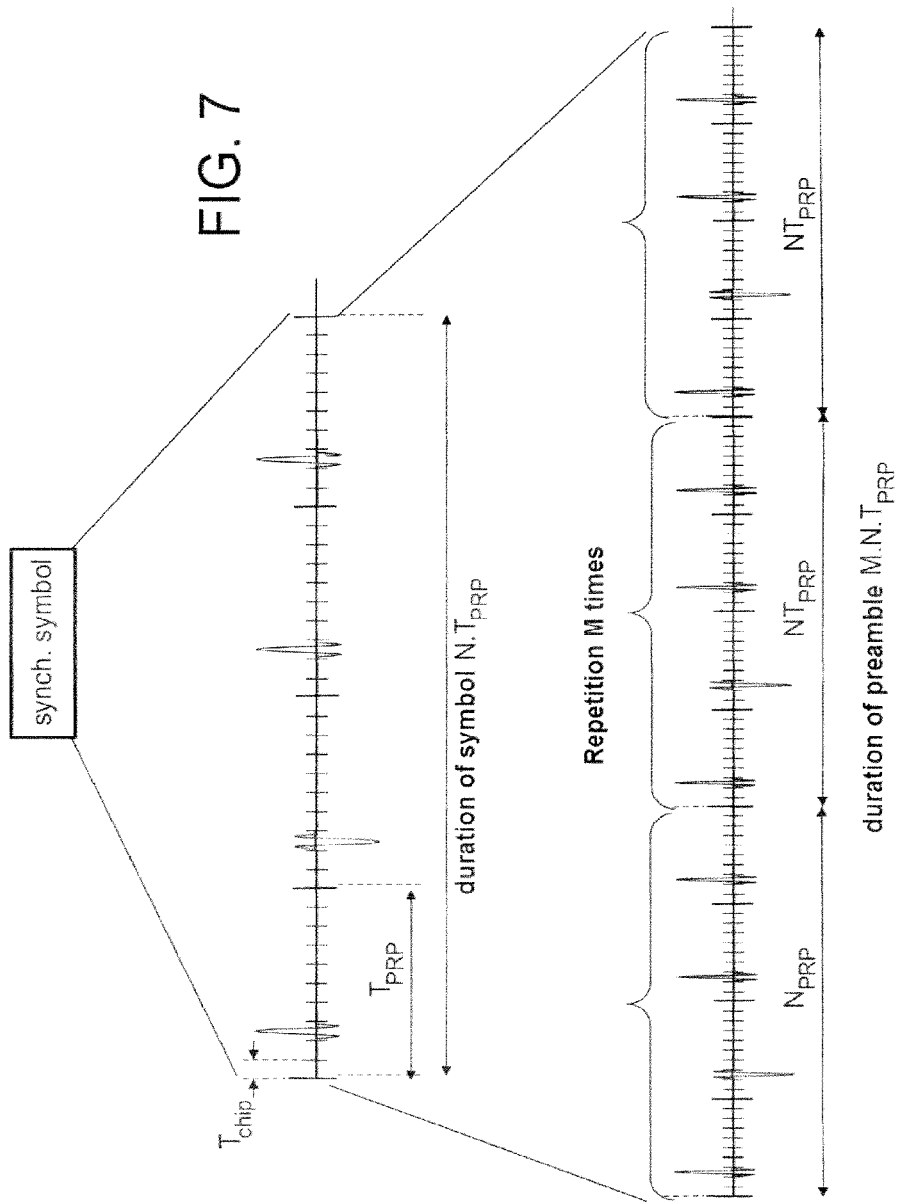
FIG. 7 depicts the construction of a synchronization preamble that can be used within the scope of the present invention.

The synchronization preamble generally comprises a sequence of M≥1 predetermined identical synchronization symbols, each synchronization symbol being encoded on N transmission unit intervals having a duration $T_{PRP}$, each transmission unit interval being able to contain a UWB unit impulse (or even a pattern of several unit impulses), as represented in FIG. 7. As a result, it is understood that a synchronization symbol is transmitted using a sequence of duration $NT_{PRP}$, the impulses of the sequence being able to be encoded using a BPSK or PPM modulation for example. Thus, the duration of the synchronization preamble is $M.N.T_{PRP}$.

In the case illustrated in FIG. 7, a synchronization symbol is encoded on N=4 unit impulses and this synchronization symbol is repeated M=3 times in the synchronization preamble. The code used is a BPSK code and the encoding sequence is here {+1, −1, +1, +1}.

Figure 8:
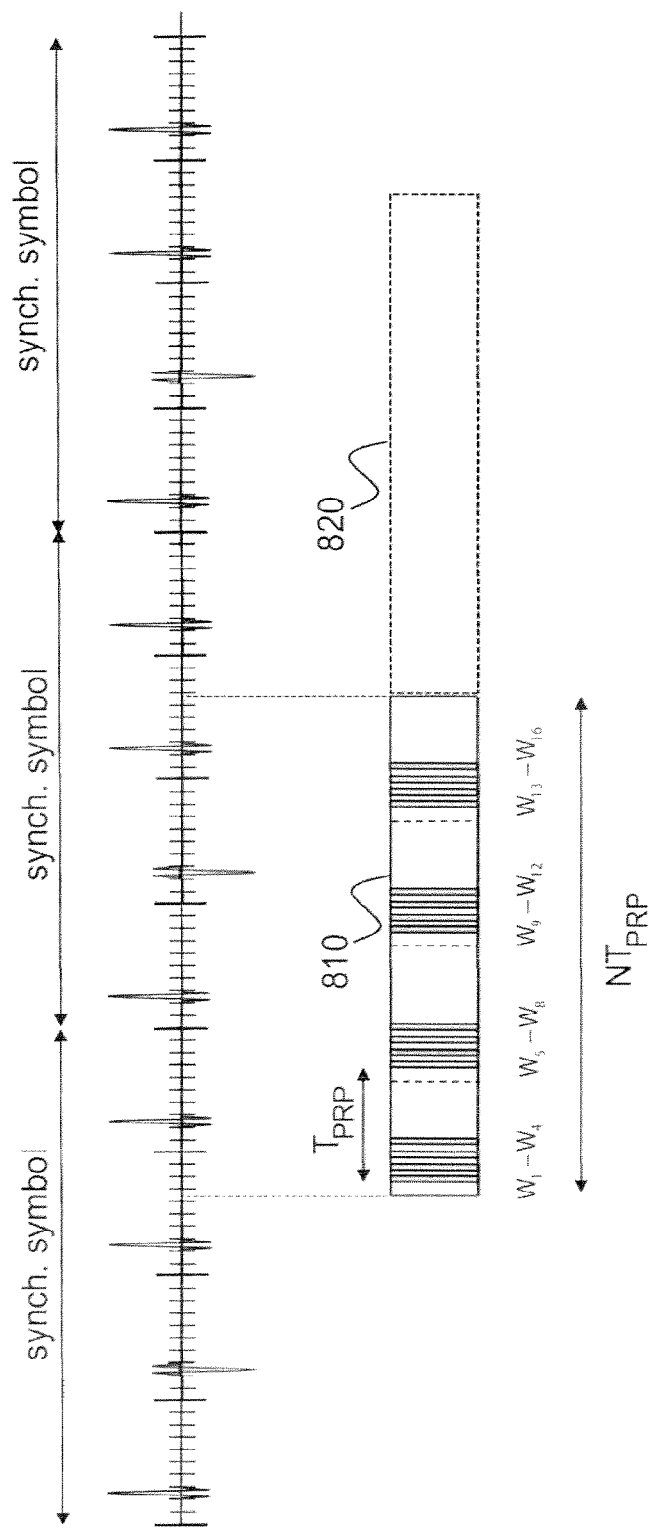
FIG. 8 depicts the scanning principle of a synchronization symbol by acquisition windows.

FIG. 8 depicts the scanning of a synchronization preamble by a reception window 810 of a duration equal to the symbol duration, namely $NT_{PRP}$. For the sake of simplification, the synchronization preamble has been here represented assuming that the channel is a single path channel. The reception window 810 is divided into N unit intervals each of duration $T_{PRP}$. In each of these unit intervals, the NK acquisition windows have been represented, that is $W_1$-$W_4$ for the first interval, $W_5$-$W_8$ for the second interval, $W_9$-$W_{12}$ for the third interval and $W_{13}$-$W_{16}$ for the last interval. Generally speaking, in the synchronization phase, K acquisition windows are provided per unit interval $T_{PRP}$. These K acquisition windows are respectively associated with the K fingers of the rake processor.

The synchronization preamble having a periodicity of $N_{PRP}$, the signals received by successive reception windows (810, 820, . . . ) are identical (to the noise and variations in the channel response). From one reception window to the following one, the NK acquisition windows are made to drift by a pitch δ within the reception window. The number K of time fingers, the spacing θ between the acquisition windows and the drifting pitch δ of these windows are chosen so as to cover the duration $NT_{PRP}$ of a synchronization symbol after M′ windows. The length M of the preamble is chosen so that M≥M′ that is so that a synchronization symbol is scanned at least once during the duration of the synchronization preamble.

It is important to note that, during the synchronization phase, the UWB receiver only operates intermittently, during the acquisition windows $W_k$, k=1, . . . , NK. More precisely, the RF stage of the receiver will only be powered during the duration of these acquisition windows, that is during a time fraction $K\tau/T_{PRP}$ where τ is the width of the time windows, advantageously chosen in the order of the width of the unit impulse.

FIGS. 9A to 9D correspond to successive reception windows. In each of them, the positions of the acquisition windows have been represented. In order to simplify the presentation, the first unit interval of the reception window and therefore the acquisition windows $W_1$ to $W_4$ are simply indicated.

Due to the absence of an initial synchronization, the beginning of the reception interval 910 does not necessarily coincide with the beginning of the transmission interval (it is here assumed to simplify that the propagation time in the transmission channel is zero), here represented by 950.

Furthermore, the channel generally comprises a direct path (LOS) as well as indirect paths corresponding to reflections on the environment. In case of non-line of sight (NLOS), the channel only comprises indirect paths. In the example depicted in FIGS. 9A-9D, the channel comprises a direct path along which the impulse 920 has propagated and three indirect paths along which the impulses 921, 922, 923 have propagated, respectively.

In the synchronization phase, the acquisition windows $W_k$, k=1, . . . , K within a same unit interval are advantageously chosen to be equidistant.

By properly choosing the parameters K, θ, δ as indicated above, the acquisition windows $W_k$, k=1, . . . , K scan the entire first unit interval at the latest after M reception windows. Generally speaking, the acquisition windows $W_{(n-1)K+k}$, k=1, . . . , K scan the entire $n^{th}$ unit interval after M reception windows. Thus, after a time $MNT_{PRP}$ an entire synchronization symbol has been acquired.

Synchronization requires the position of a synchronization symbol to be determined relative to the reception window. To do so, for each reception window m=1, . . . , M the KN processing results from the rake processor are stored in the acquisition windows $W_{(n-1)K+k}$, n=1, . . . , N, k=1, . . . , K, knowing that each window $W_{(n-1)K+k}$ is shifted by δ between two consecutive reception windows.

If it is denoted $r_{(n-1)K+k}$ the processing result (for example integration), of one of the signals $s_{II}$, $s_{IQ}$, $s_{QI}$, $s_{QQ}$ at the output of the second mixing stage, on the acquisition window $W_{(n-1)K+k}$, a cyclic correlation of the processing results is carried out for each reception window, with the encoding sequence:

$$C_i^k = \sum_{n=1}^{N} \varepsilon_n r_{mod(n-1)K+k+i,N}, k = 1, \ldots, K$$

where $\epsilon = \epsilon_1, \ldots, \epsilon_N$ is the encoding sequence (here a BPSK modulation). When the modulation is a PPM modulation, the summation is similarly carried out on the N processing results, except that the position of the windows $W_{(n-1)K+k}$ then depends on the modulation position given by $\epsilon_n$.

When a value $C_i^k$ greater than a predetermined threshold (indicating the maximum of correlation) is obtained for a same value of i and a same position of the windows $W_{(n-1)K+k}$, the value i gives the time position of the reception window relative to the beginning of the synchronization symbol.

Among the MNK processing results corresponding to the scanning of the reception interval, by means of a comparison, the K′ values having the strongest amplitude can then be selected. These K′ values correspond to the K′ most significant paths of the channel. The number K′ can be chosen as a function of the complexity of the desired processing (depending on the computing resources of the receiver) or by setting a minimum amplitude threshold.

During the reception phase of the payload (tracking phase), the K′ fingers of the Rake filter are centred on the K′ acquisition windows, selected at the end of the synchronization phase.

During the reception phase, the receiver continues to operate in an intermittent mode, during the K′ selected acquisition windows, in other words during a given time fraction $K'\tau/T_{PRP}$.

Figure 10:
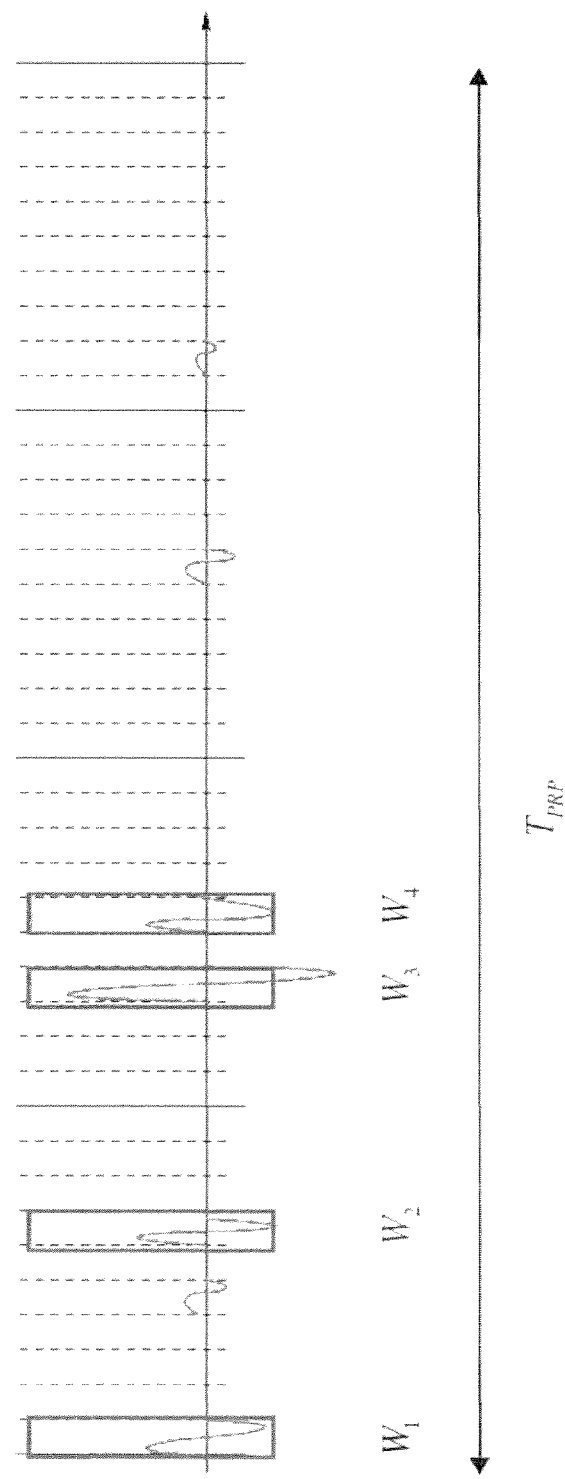
FIG. 10 represents the acquisition windows associated with different fingers of the rake processor, during the demodulation and tracking phase of the receiver.

FIG. 10 represents a reception interval of the payload in which K' acquisition windows have been selected, corresponding to the K' impulses of the largest amplitude (that is the most energetic impulses) in said interval. The control module of the receiver drives the time positions of the different fingers so that the latter carry out the processing of the baseband signal during these K' acquisition windows.

The results $r_{II}^k$, $r_{IQ}^k$, $r_{QI}^k$, $r_{QQ}^k$, $k=1, \ldots, K'$ are subsequently summed in a coherent or non-coherent way in the detection module as described above.

The invention claimed is:

1. A UWB (Ultra Wide Band) impulse signal receiver, the UWB signal being time-divided into unit intervals of a predetermined duration, a symbol being transmitted over a plurality N of unit intervals, each unit interval including a unit impulse, the UWB signal including a synchronization preamble followed by a payload, the synchronization preamble including a sequence of M identical symbols, the receiver comprising:
   an RF (radio frequency) stage followed by a baseband processing stage, the RF stage being configured to amplify the signal and to carry out a translation into baseband of the amplified signal, wherein the baseband processing stage comprises at least a rake processor comprising a plurality K of time fingers, each time finger configured to carry out a processing of a different acquisition window of time associated with the finger,
   wherein the receiver is further configured to
      estimate at least one received symbol from processing results supplied by the fingers, and
      control respective positions of the acquisition windows within a reception interval, to scan the reception interval in a course of a synchronization phase, the RF stage only operating, in the course of the synchronization phase, during the plurality of acquisition windows,
   wherein N, M, and K are each an integer value greater than 1,
   wherein the processing carried out by each time finger is an integration, each respective time finger integrating the baseband signal in the acquisition window associated with the respective finger, and
   wherein the receiver drives the acquisition windows so that the acquisition windows drift by a predetermined time pitch from one reception interval to a following reception interval.

2. The UWB impulse signal receiver according to claim 1, wherein the RF stage comprises a low noise amplifier followed by a first quadrature mixing stage supplying an in-phase channel and a quadrature channel.

3. The UWB impulse signal receiver according to claim 2, wherein the RF stage comprises a pair of low pass or band-pass filters of controllable cut-off frequencies, the pair of filters respectively filtering the in-phase channel and the quadrature channel.

4. The UWB impulse signal receiver according to claim 2, wherein the RF stage comprises a second quadrature mixing stage translating into baseband the in-phase channel to supply first and second orthogonal signals and the quadrature channel to supply third and fourth orthogonal signals.

5. The UWB impulse signal receiver according to claim 2, wherein the RF stage comprises a second quadrature mixing stage projecting the in-phase channel on an orthogonal base of reference signals, to supply first and second orthogonal signals, and projecting the quadrature channel on a same base, to supply third and fourth orthogonal signals.

6. The UWB impulse signal receiver according to claim 4, wherein each time finger comprises first, second, third, and fourth integrators to respectively integrate the first, second, third, and fourth orthogonal signals on the acquisition window associated with the finger, integration results from these integrators being used by the receiver to estimate the at least one received symbol.

7. The UWB impulse signal receiver according to claim 6, wherein the integration results from the first, second, third, and fourth integrators are digitized in first, second, third, and fourth analog/digital converters before being used by the receiver to estimate the at least one received symbol.

8. The UWB impulse signal receiver according to claim 1, wherein powering of the RF stage is cut-off outside the plurality of acquisition windows.

9. The UWB impulse signal receiver according to claim 1, wherein at an end of synchronization phase, energies respectively received in the acquisition windows, in a course of the scanning of the reception interval, are compared to each other and a second plurality of time positions is determined corresponding to highest received energies, acquisition windows of the rake processor being respectively positioned on the second plurality of time positions in a payload reception phase following the synchronization phase.

10. A method implemented by a UWB (Ultra Wide Band) impulse signal receiver, the UWB signal being time-divided into unit intervals of a predetermined duration, a symbol being transmitted over a plurality N of unit intervals, each unit interval including a unit impulse, the UWB signal including a synchronization preamble followed by a payload, the synchronization preamble including a sequence of M identical symbols, the receiver being configured to implement an RF (radio frequency) stage followed by a baseband processing stage, the baseband processing stage including a rake processor comprising a plurality K of time fingers, a detection module, and a control module, the method comprising:
   amplifying, by the RF stage, the signal and to carry out a translation into baseband of the amplified signal;
   carrying out, at each time finger, a processing of a different acquisition window of time associated with the finger;
   estimating, by the detection module, at least one received symbol from processing results supplied by the fingers;
   controlling, by the control module, respective positions of the acquisition windows within a reception interval, to scan the reception interval in a course of a synchronization phase, the RF stage only operating, in the course of the synchronization phase, during the plurality of acquisition windows,
   wherein N, M, and K are each an integer value greater than 1,
   wherein the processing carried out by each time finger is an integration, each respective time finger integrating the baseband signal in the acquisition window associated with the respective finger, and
   wherein the control module drives the acquisition windows so that the acquisition windows drift by a predetermined time pitch from one reception interval to a following reception interval.

\* \* \* \* \*